United States Patent
Ishikawa

(10) Patent No.: US 10,144,406 B2
(45) Date of Patent: Dec. 4, 2018

(54) POWER TRANSMISSION APPARATUS

(71) Applicant: SUBARU CORPORATION, Tokyo (JP)

(72) Inventor: Masatoshi Ishikawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 12 days.

(21) Appl. No.: 15/595,225

(22) Filed: May 15, 2017

(65) Prior Publication Data

US 2018/0029584 A1    Feb. 1, 2018

(30) Foreign Application Priority Data

Jul. 26, 2016  (JP) ................................. 2016-146580

(51) Int. Cl.
*B60W 10/115* (2012.01)
*B60W 20/20* (2016.01)
(Continued)

(52) U.S. Cl.
CPC ......... *B60W 10/115* (2013.01); *B60K 28/165* (2013.01); *B60W 20/20* (2013.01); *F16H 59/68* (2013.01); *F16H 61/36* (2013.01); *B60K 6/547* (2013.01); *B60K 28/10* (2013.01); *B60W 10/06* (2013.01); *B60W 10/10* (2013.01); *B60W 20/19* (2016.01); *B60W 20/30* (2013.01); *F16H 61/456* (2013.01); *F16H 2059/6892* (2013.01)

(58) Field of Classification Search
CPC ..... B60W 20/20; B60W 20/30; B60W 10/115
See application file for complete search history.

(56) References Cited

U.S. PATENT DOCUMENTS 6,506,139 B2 *  1/2003  Hirt ........................ B60K 6/365
                                                   477/3
6,575,866 B2 *  6/2003  Bowen ................... B60K 6/365
                                                   475/5
(Continued)

FOREIGN PATENT DOCUMENTS

JP    2005-045863 A    2/2005
JP    2005-297786 A   10/2005
(Continued)

OTHER PUBLICATIONS

JPO Decision to Grant a Patent dated May 15, 2018 in Japanese Application No. 2016-146580.
(Continued)

*Primary Examiner* — Todd M Melton
(74) *Attorney, Agent, or Firm* — McGinn IP Law Group, PLLC.

(57) ABSTRACT

A power transmission apparatus that is mountable on a vehicle includes a planetary gear mechanism, a first motor generator, a second motor generator, and a stepped automatic transmission with parallel gears. The first motor generator and an output side shaft of the stepped automatic transmission are configured to be coupled to a power input shaft from an engine provided in the vehicle via the planetary gear mechanism. An input side shaft of the stepped automatic transmission is configured to be coupled to the power input shaft. The second motor generator is coupled to the output side shaft of the stepped automatic transmission.

11 Claims, 7 Drawing Sheets

(51) Int. Cl.
    *B60W 20/30*     (2016.01)
    *F16H 59/68*     (2006.01)
    *B60K 28/16*     (2006.01)
    *F16H 61/36*     (2006.01)
    *B60W 20/19*     (2016.01)
    *B60K 6/547*     (2007.10)
    *B60K 28/10*     (2006.01)
    *B60W 10/06*     (2006.01)
    *B60W 10/10*     (2012.01)
    *F16H 61/456*     (2010.01)

(56) References Cited

U.S. PATENT DOCUMENTS

| | | | |
|---|---|---|---|
| 8,753,242 B2 * | 6/2014 | Hibino | B60K 6/38 |
| | | | 475/5 |
| 9,145,962 B2 * | 9/2015 | Noguchi | F16H 37/065 |
| 2010/0173746 A1 | 7/2010 | Ideshio et al. | |
| 2012/0006153 A1 * | 1/2012 | Imamura | B60K 6/442 |
| | | | 74/665 A |

FOREIGN PATENT DOCUMENTS

| | | |
|---|---|---|
| JP | 2008-179356 A | 8/2008 |
| JP | 2008-247271 A | 10/2008 |
| JP | 2009-001079 A | 1/2009 |
| JP | 2010-076680 A | 4/2010 |

OTHER PUBLICATIONS

JPO Notification of Reasons for Refusal dated Nov. 14, 2014 in Japanese Application No. 2016-146580.

\* cited by examiner

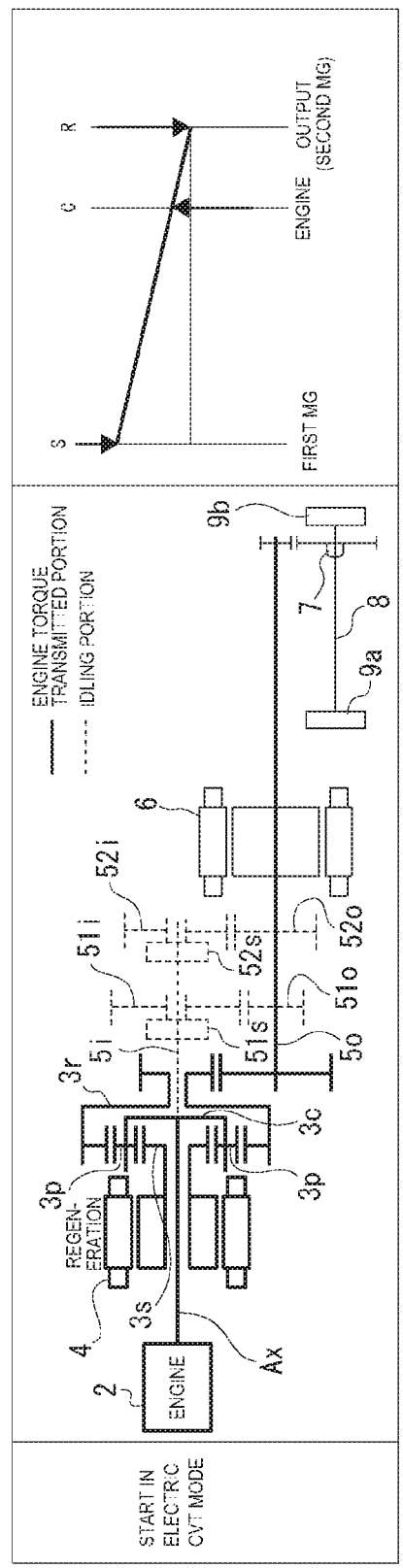

POWER TRANSMISSION APPARATUS

CROSS-REFERENCE TO RELATED APPLICATIONS

The present application claims priority from Japanese Patent Application No. 2016-146580 filed on Jul. 26, 2016, the entire contents of which are hereby incorporated by reference.

BACKGROUND

1. Technical Field

The present invention relates to a technical field of a power transmission apparatus that includes a stepped automatic transmission with parallel gears.

2. Related Art

As a power transmission apparatus that transmits power from an engine to a drive wheel side in a vehicle, a power transmission apparatus that includes an automatic transmission has been known. In recent years, a winding continuously variable transmission (CVT) in which a winding member, such as a metal belt or chain, is wound around opposing pulleys has widely been spread as the automatic transmission, for instance. The automatic transmission of this kind can seamlessly adjust a transmission gear ratio and thus has such an advantage that it can efficiently use an engine power band when compared to a traditional transmission.

However, in a vehicle for which the winding CVT is adopted, relatively high hydraulic pressure is required for actuation control of a torque converter and hydraulic control to drive the pulleys, which leads to a degraded fuel consumption rate (hereinafter "fuel consumption") of the engine as a drive source for an oil pump and to degraded power transmission efficiency to the drive wheel side. Furthermore, degraded drivability that produces so-called rubber band feeling has also been pointed out.

Compared to this CVT, a traditional transmission with parallel gears that is used in a manual transmission vehicle is superior in terms of the fuel consumption and the drivability. However, a clutch is required for the vehicle using the traditional transmission, and the clutch synchronizes rotation of an input side shaft and rotation of an output side shaft of engine power at times of a vehicle start and a gear change (shift change).

Because the clutch is a mechanism, friction of which is assumed, the clutch is relatively and severely deteriorated by age. In addition, because the clutch generates a relatively large amount of heat at the start, it is technically difficult to obtain relatively large starting drive power particularly in a large vehicle and the like.

Japanese Unexamined Patent Application Publication (JP-A) No. 2005-45863 and JP-A No. 2008-247271 disclose configurations that the stepped automatic transmission with the parallel gears is coupled to an output shaft of the engine and that a rotary electric machine (motor) is coupled to an output shaft of the stepped automatic transmission in a parallel hybrid system. In these configurations, the vehicle is started by using power of the rotary electric machine. Furthermore, an engine rotational speed and a rotational speed of the output shaft are controlled to be synchronized during the shift change of the stepped automatic transmission (during switching of a shaft stage). Thus, the clutch can no longer be provided.

When the shift stage of the traditional transmission with the parallel gears is changed, prevention of so-called torque loss is demanded. JP-A No. 2005-45863 and JP-A No. 2008-247271, which are described above, each disclose a configuration of preventing the torque loss by actuating the rotary electric machine during the shift change.

However, in order to prevent occurrence of the torque loss in the configuration disclosed in each of JP-A No. 2005-45863 and JP-A No. 2008-247271, the rotary electric machine that can theoretically generate an equivalent magnitude of torque to a magnitude of engine torque is demanded, which tends to enlarge the rotary electric machine. Accordingly, due to increased vehicle weight, fuel consumption is increased, and vehicle design is restricted.

SUMMARY OF THE INVENTION

It is desirable to prevent an increase in fuel consumption and restriction on vehicle design while preventing torque loss during a shift change in order to improve starting quality by eliminating a clutch and allow efficient transmission of engine power to a drive wheel via a traditional transmission with parallel gears.

An aspect of the present invention provides a power transmission apparatus configured to be mounted on a vehicle. The apparatus includes a planetary gear mechanism, a first motor generator, a second motor generator, and a stepped automatic transmission with parallel gears. The first motor generator and an output side shaft of the stepped automatic transmission are configured to be coupled to a power input shaft from an engine provided in the vehicle via the planetary gear mechanism. An input side shaft of the stepped automatic transmission is configured to be coupled to the power input shaft. The second motor generator is coupled to the output side shaft of the stepped automatic transmission.

The power transmission apparatus may further include a control unit configured to synchronize rotation of the input side shaft and rotation of the output side shaft in the stepped automatic transmission by causing regenerative rotation of the first motor generator to reduce an engine rotational speed when a shift stage is changed to a shift stage with a lower transmission gear ratio in the stepped automatic transmission.

The control unit may be configured to be able to make the first motor generator rotate idle while coupling by any one of the shift stages in the stepped automatic transmission is made and engine power that is transmitted to the input side shaft is transmitted to the output side shaft.

The control unit may be configured to determine whether the first motor generator satisfies a specified upper limit temperature condition in response to an increase in a vehicle speed while a travel mode in which the vehicle travels an electric CVT mode, execute control such that that the travel mode is selected from the electric CVT mode and a travel in the first speed direct coupling mode on the basis of a fuel consumption rate of the engine when the temperature condition is satisfied, and execute control such that the travel mode is switched to the first speed direct coupling mode regardless of the fuel consumption rate in the electric CVT mode and the fuel consumption rate in the first speed direct coupling mode when the temperature condition is not satisfied. The electric CVT mode may be a mode in which the stepped automatic transmission is in a neutral state and the first motor generator establishes a reactive force against the engine power by the regenerative rotation via the planetary gear mechanism. The first speed direct coupling mode may be a mode in which the engine power is transmitted from the input side shaft to the output side shaft via a first shift stage with the highest transmission gear ratio in the stepped automatic transmission.

The control unit may be configured to identify a magnitude relationship between a fuel consumption rate of the engine in a case that coupling by the current shift stage in the stepped automatic transmission is maintained while a travel mode in which the vehicle travels is an direct coupling mode, and the fuel consumption rate of the engine while the travel mode is the electric CVT mode, and execute control such that the travel mode is switched to the electric CVT mode when the fuel consumption rate in the electric CVT mode is the lowest. The electric CVT mode may be a mode in which the stepped automatic transmission is brought into the neutral state and the first motor generator establishes the reactive force against the engine power by the regenerative rotation via the planetary gear mechanism. The direct coupling mode may be a mode in which coupling by any one of the shift stages in the stepped automatic transmission is made and the engine power is transmitted from the input side shaft to the output side shaft via the any one of the shift stages.

The control unit may be configured to execute control that switches the travel mode to the electric CVT mode under such a condition that the first motor generator satisfies a specified upper limit temperature condition.

The control unit may be configured to increase an electric power generation amount by the first motor generator, eliminate the engine power that is transmitted through coupling by an original shift stage, and then cancel the coupling by the original shift stage when the shift stage is changed to the shift stage with the lower transmission gear ratio in the stepped automatic transmission.

BRIEF DESCRIPTION OF THE DRAWINGS

FIG. 7 is a view that explains a start in an electric CVT mode.

DETAILED DESCRIPTION

1. Schematic Configuration of a Vehicle

Figure 1:
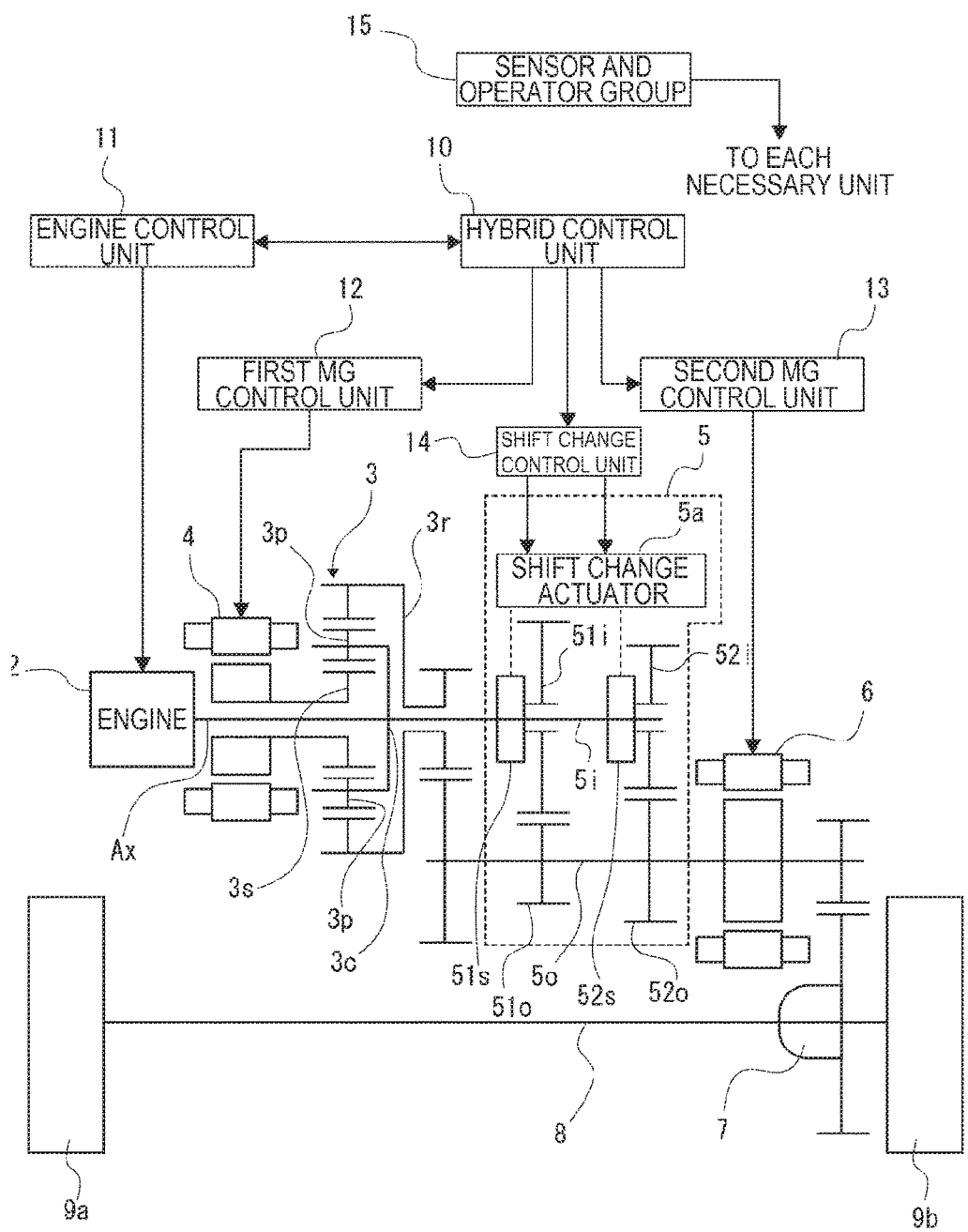
FIG. 1 is a view that schematically illustrates a configuration of a vehicle including a power transmission apparatus as an example.

FIG. 1 is a view that schematically illustrates a configuration of a vehicle 1 including a power transmission apparatus as an example according to the present invention. Note that, of the configuration of the vehicle 1, only configurations of main components related to the present invention are mainly extracted and illustrated in FIG. 1.

In FIG. 1, the vehicle 1 includes: an engine 2; a power input shaft Ax that is coupled to a crankshaft (not illustrated) as a power output shaft of the engine 2 and receives power from the engine 2; a planetary gear mechanism 3 that can receive the power of the engine 2 via the power input shaft Ax; a first motor generator 4; a stepped automatic transmission 5 with parallel gears; a second motor generator 6; a differential gear 7; a drive shaft 8; a drive wheel 9a; and a drive wheel 9b.

Note that the "motor generator" will hereinafter be abbreviated as an "MG".

The planetary gear mechanism 3 includes: a sun gear 3s as an external gear; a ring gear 3r as an internal gear that is concentrically disposed with the sun gear 3s; plural pinion gears (planetary gears) 3p that mesh with the sun gear 3s and also mesh with the ring gear 3r; and a carrier 3c that holds the plural pinion gears 3p in a manner to allow rotation and revolution of the plural pinion gears 3p. The planetary gear mechanism 3 is configured as a gear mechanism that performs a differential action with the sun gear 3s, the ring gear 3r, and the carrier 3c being rotating elements.

In the planetary gear mechanism 3 of this example, the carrier 3c is coupled to the power input shaft Ax and thus can receive the power from the engine 2, the sun gear 3s is coupled to a rotor of the first MG4, and the ring gear 3r is coupled to an output side shaft (counter shaft) 5o of the stepped automatic transmission 5, which will be described below.

The stepped automatic transmission 5 includes an input side shaft (input shaft) 5i and the output side shaft 5o, and also includes: a drive gear 51i, a driven gear 51o, and a coupling mechanism 51s that constitute a first shift stage; and a drive gear 52i, a driven gear 52o, and a coupling mechanism 52s that constitute a second shift stage; and a shift change actuator 5a. The input side shaft 5i of the stepped automatic transmission 5 is coupled to the power input shaft Ax from the engine 2. In this way, the input side shaft 5i can rotate in an interlocking manner with the power input shaft Ax and the carrier 3c in the planetary gear mechanism 3.

The first shift stage is a shift stage with a larger transmission gear ratio (gear ratio) than the second shift stage.

In this example, a constantly meshing transmission is adopted as the stepped automatic transmission 5. At each of the shift stages, the driven gears 51o, 52o are fixed to the output side shaft 5o and rotate in the interlocking manner with the output side shaft 5o, the drive gear 51i meshes with the driven gear 51o, and the drive gear 52i meshes with the driven gear 52o. The drive gears 51i, 52i are not fixed to the input side shaft 5i and can rotate independently from the input side shaft 5i.

In addition, in this example, a synchromesh mechanism is adopted as each of the coupling mechanisms 51s, 52s. The coupling mechanism 51s is provided with: a clutch hub having an engagement part that is fixed to the input side shaft 5i and can be engaged with the drive gear 51i; and a clutch sleeve that displaces the clutch hub when sliding in an axial direction of the input side shaft 5i, so as to engage the clutch hub with the drive gear 51i through the engagement part. Similarly, the coupling mechanism 52s is provided with: a clutch hub having an engagement part that is fixed to the input side shaft 5i and can be engaged with the drive gear 52i; and a clutch sleeve that displaces the clutch hub when sliding in the axial direction of the input side shaft 5*i*, so as to engage the clutch hub with the drive gear 52*i* through the engagement part.

At the first and second shift stages, the clutch hubs of the coupling mechanisms 51*s*, 52*s* are respectively engaged with the drive gears 51*i*, 52*i*, and rotary power of the input side shaft 5*i* is thereby transmitted to the driven gears 51*o*, 52*o* via the drive gears 51*i*, 52*i*. In other words, the coupling mechanisms 51*s*, 52*s* bring the input side shaft 5*i* and the output side shaft 5*o* into coupled states at any of the shift stages. In this way, engine power can directly be transmitted to the output side shaft 5*o* via the power input shaft Ax and the input side shaft 5*i*.

The shift change actuator 5*a* is an actuator, such as a motor and a solenoid, that makes the clutch sleeves in the coupling mechanisms 51*s*, 52*s* slide in the axial direction of the input side shaft 5*i*.

Note that a state where coupling is canceled at all of the shift stages in the stepped automatic transmission 5 will hereinafter be described as a "neutral state". In addition, the first shift stage and the second shift stage in the stepped automatic transmission 5 will respectively be abbreviated as a "first speed" and a "second speed".

Note that the adoption of the constantly meshing transmission as the stepped automatic transmission 5 is not essential, and a selective sliding transmission in which only a drive gear and a driven gear at a selected shift stage mesh with each other may be adopted. In addition, instead of the mechanism that corresponds to a synchromesh type, a mechanism that corresponds to a non-synchromesh type may be adopted as each of the coupling mechanisms 51*s*, 52*s*.

The output side shaft 5*o* of the stepped automatic transmission 5 is coupled to the drive wheels 9*a*, 9*b* via a rotor of the second MG 6, the differential gear 7, and the drive shaft 8. In this way, the power generated by the engine 2 and the second MG 6 can be transmitted to the drive wheels 9*a*, 9*b*.

The first MG 4 and the second MG 6 are each constructed of a well-known synchronous generator motor that can be driven as a generator and can also be driven as an electric motor. Each of these first MG 4 and second MG 6 is a motor generator that has plural excitation phases. More specifically, a three-phase AC motor generator is adopted therefor in this example.

The first MG 4 can adjust a load on the engine 2 by generating electric power at a time when the power input shaft Ax receives the power of the engine 2. In other words, when the engine 2 is in a driving state, the first MG 4 can establish a reactive force against the engine power via the planetary gear mechanism 3.

In the vehicle 1, an electric circuit, which is not illustrated, can supply the electric power generated by the first MG 4 to a drive circuit of the second MG 6. In other words, while generating the electric power, the first MG 4 uses the generated electric power to drive the second MG 6, and power of the second MG 6 can be transmitted to the drive wheels 9*a*, 9*b*.

The vehicle 1 also includes, as components that control actuation of units described above, a hybrid control unit 10, an engine control unit 11, a first MG control unit 12, a second MG control unit 13, a shift change control unit 14, and a sensor and operator group 15.

The sensor and operator group 15 collectively represents various sensors and operators that are provided in the vehicle 1. As the sensors included in the sensor and operator group 15, a vehicle speed sensor that detects a travel speed of the vehicle 1 (hereinafter described as a "vehicle speed V"), an engine rotation speed sensor that detects a rotation speed of the engine 2, an accelerator opening degree sensor that detects an accelerator opening degree from a depression amount of an accelerator pedal, a G sensor that detects acceleration acting on the vehicle 1, and the like are provided. In addition, the other sensors include: an output side shaft rotation speed sensor that detects a rotational speed of the output side shaft 5*o* of the stepped automatic transmission 5; a first MG temperature sensor that detects a temperature of the first MG 4 (for instance, a temperature of the rotor or a temperature of a stator including a drive coil); an SOC sensor that detects a state of charge (SOC) of a travel battery, which is not illustrated and which is used as an electric drive power source of the first MG 4 and the second MG 6; a brake switch that is turned ON/OFF in an interlocking manner with presence or absence of a brake pedal operation; an intake air amount sensor that detects an intake air amount to the engine 2; a throttle opening degree sensor that detects an opening degree of a throttle valve disposed in an intake passage to adjust the intake air amount supplied to each cylinder of the engine 2; a water temperature sensor that detects a coolant temperature indicative of an engine temperature; an external temperature sensor that detects a temperature outside the vehicle, and the like.

As the operators, various operators such as a start switch to activate the vehicle 1 into a state capable of traveling and a button used by an occupant including a driver to input various types of information are provided.

A detection signal of each of the sensors and an operation input signal based on an operation of each of the operators in the sensor and operator group 15 are supplied to the necessary units such as the hybrid control unit 10 and the engine control unit 11 described above.

The hybrid control unit 10 and the engine control unit 11 are each configured by having a microcomputer that includes, for instance, a central processing unit (CPU), read only memory (ROM), and random access memory (RAM). The hybrid control unit 10 and the engine control unit 11 are mutually coupled in a manner to allow data communication via a bus that complies with a specified in-vehicle network communication standard such as a controller area network (CAN).

The engine control unit 11 executes various types of operation control such as fuel injection control, ignition control, and intake air amount adjustment control for the engine 2. The engine control unit 11 communicates with the hybrid control unit 10, controls the operation of the engine 2 on the basis of an instruction from the hybrid control unit 10, and outputs data on the driving state of the engine 2 to the hybrid control unit 10 when necessary.

The first MG control unit 12, the second MG control unit 13, and the shift change control unit 14 are configured by having control circuits such as the microcomputers, and drive circuits that respectively send drive signals to the first MG 4, the second MG 6, and the shift change actuator 5*a* as control targets. These first MG control unit 12, second MG control unit 13, and shift change control unit 14 are coupled to the hybrid control unit 10. The first MG control unit 12, the second MG control unit 13, and the shift change control unit 14 respectively control driving of the first MG 4, the second MG 6, the shift change actuator 5*a* in the stepped automatic transmission 5 on the basis of instructions from the hybrid control unit 10.

Based on the detection signal from the specified sensor and the operation input signal from the specified operator in the sensor and operator group 15, the hybrid control unit 10 instructs the engine control unit 11, the first MG control unit 12, the second MG control unit 13, and the shift change control unit 14 to control behavior of the vehicle 1 in accordance with operation input by the driver and the state of the vehicle 1.

for instance, based on an accelerator opening degree value that is calculated on the basis of the detection signal of the above-described accelerator opening degree sensor, the hybrid control unit 10 calculates requested torque T (torque that should be output to the drive wheels 9a, 9b) that corresponds to the accelerator operation amount by the driver, and instructs the engine control unit 11, the first MG control unit 12, and the second MG control unit 13 to respectively control actuation of the engine 2, the first MG 4, and the second MG 6, so as to make the vehicle 1 travel using requested drive power that corresponds to the requested torque T.

In this example, as travel modes of the vehicle 1, an electric vehicle (EV) mode, an electric continuously variable transmission (CVT) mode, and a direct coupling mode are prepared.

The EV mode is a mode in which only the power of the second MG 6 is transmitted to the drive wheels 9a, 9b to make the vehicle 1 travel.

The electric CVT mode is a mode in which the reactive force against the engine power is established through regenerative rotation (electric power generation) of the first MG 4 via the planetary gear mechanism 3 under the neutral state of the stepped automatic transmission 5. In the electric CVT mode, the transmission gear ratio can seamlessly be adjusted by adjusting an electric power generation amount of the first MG 4.

The direct coupling mode is a mode in which the components constituting any of the shift stages in the stepped automatic transmission 5 are brought into coupled states and the engine power is thereby transmitted to the drive wheels 9a, 9b via the shift stage.

Note that a travel in the EV mode, a travel in the electric CVT mode, and a travel in the direct coupling mode may hereinafter be abbreviated as an "EV travel", an "electric CVT travel", and a "direct coupling travel", respectively.

During the above EV mode, the hybrid control unit 10 calculates requested torque to the second MG 6 (hereinafter described as "requested torque Tb") on the basis of the requested torque T, which is calculated on the basis of the accelerator operation amount, and instructs the second MG control unit 13 on the requested torque Tb so as to control the behavior of the second MG 6.

In addition, during the electric CVT mode, the hybrid control unit 10 calculates requested torque to the engine 2 (hereinafter described as "requested torque Te"), requested torque to the first MG 4 (hereinafter described as "requested torque Ta"), and the requested torque Tb to the second MG 6 on the basis of the requested torque T, and respectively instructs the engine control unit 11, the first MG control unit 12, and the second MG control unit 13 on the requested torque Te, the requested torque Ta, and the requested torque Tb so as to control the behavior of the engine 2, the first MG 4, and the second MG 6.

2. Overview of Travel Control as the Example

The hybrid control unit 10 of the example executes control of appropriately switching among the above EV mode, electric CVT mode, and direct coupling mode as will be described below to make the vehicle 1 travel.

Figure 2:
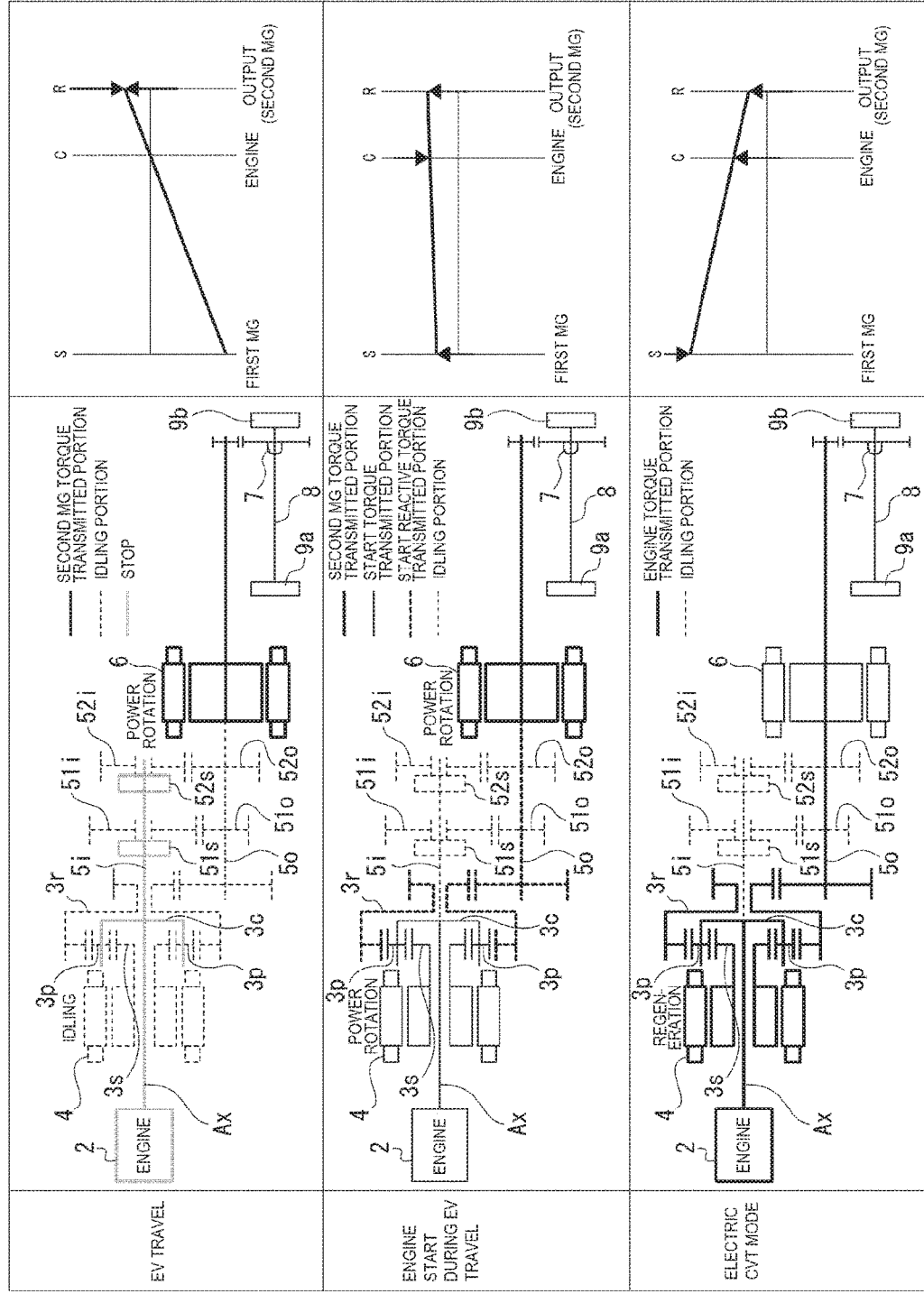
FIG. 2 includes views that schematically explain travel control as the example.
Figure 3:
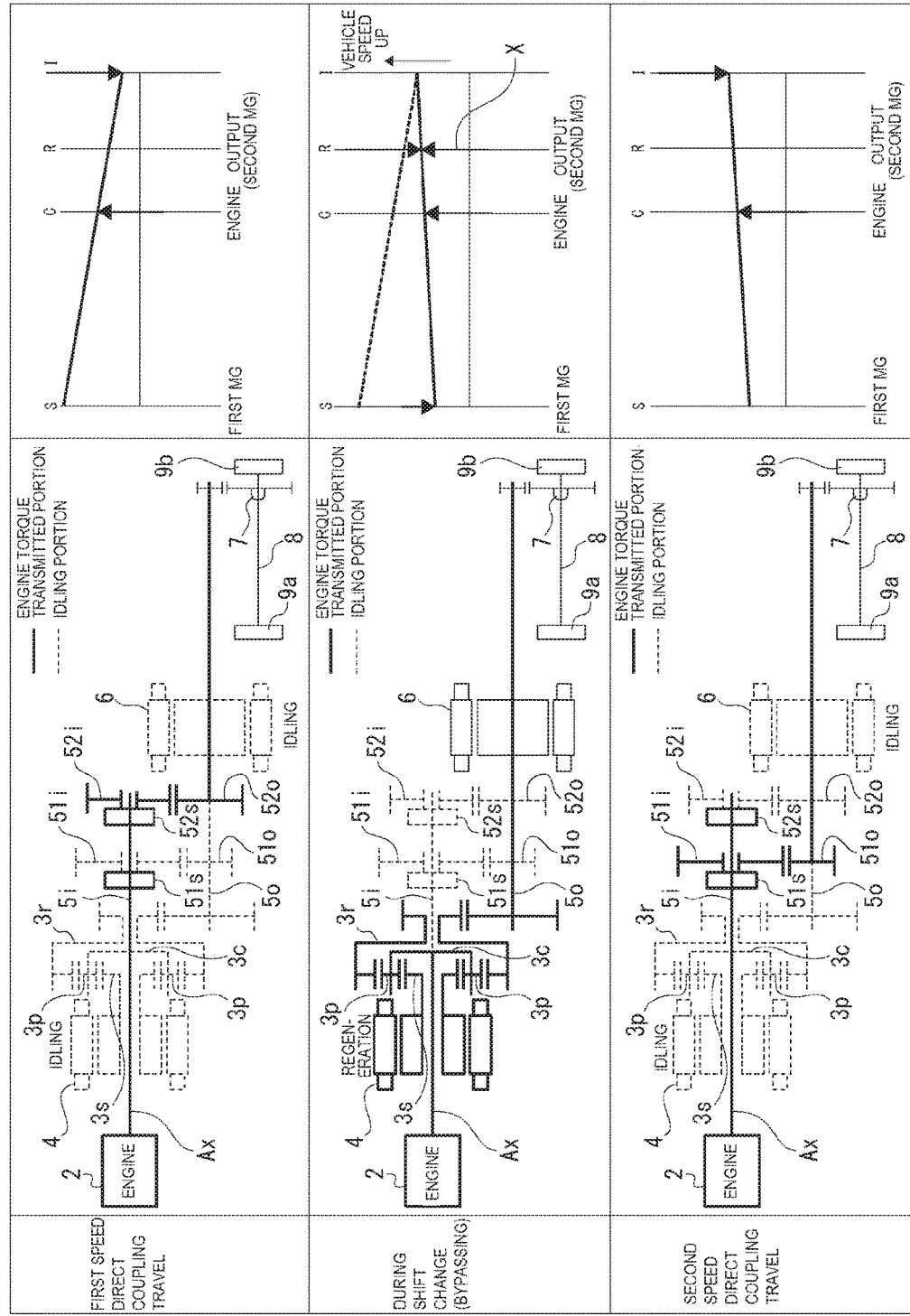
FIG. 3 also includes views that schematically explain the travel control as the example.

FIG. 2 and FIG. 3 include views that schematically explain travel control as the example. In each of FIGS. 2A, 2B, 2C and FIGS. 3A, 3B, 3C, a control process at a time when the vehicle speed V is gradually increased by an accelerator operation is represented by a schematic view and a collinear diagram of the power transmission apparatus provided in the vehicle 1. Note that each of the collinear diagrams illustrates a mechanical relationship between number of rotations of each of the rotating elements of the planetary gear mechanism 3 and the torque and that an "S" axis, a "C" axis, and an "R" axis respectively correspond to the rotational speed of the sun gear 3s (the first MG 4), the rotational speed of the carrier 3c (the engine 2), and the rotational speed of the ring gear 3r (the second MG 6).

First, in this example, the vehicle is started from the vehicle speed V=0 in the EV travel illustrated in FIG. 2A. More specifically, the hybrid control unit 10 brings the engine 2 into a stopped state, the first MG 4 into a non-driven state, and the stepped automatic transmission 5 into the neutral state and causes power rotation of the second MG 6 to drive the drive wheels 9a, 9b. Because the engine 2 is in the stopped state at this time, the power input shaft Ax, the carrier 3c, and the input side shaft 5i (and the clutch hubs in the coupling mechanisms 51s, 52s) of the stepped automatic transmission 5 are each brought into a rotation stopped state. In addition, in conjunction with the rotation of the second MG 6, the output side shaft 5o (as well as the drive gears 51i, 52i and the driven gears 51o, 52o) of the stepped automatic transmission 5, the ring gear 3r, the pinion gears 3p, and the first MG 4 are each brought into an idle state.

After the vehicle 1 is started in the EV travel, as illustrated in FIG. 2B, the hybrid control unit 10 causes power rotation of the first MG 4 to crank the engine 2 and makes the engine control unit 11 execute start control (the ignition control and the fuel injection control) of the engine 2. Note that, at this start time, the power of the first MG 4 is transmitted to the engine 2 via the sun gear 3s, the pinion gears 3p, the carrier 3c, and the power input shaft Ax. In addition, the reactive force (start reactive torque) of the first MG 4 against engine start torque is transmitted to the ring gear 3r and the output side shaft 5o of the stepped automatic transmission 5. Because the stepped automatic transmission 5 is in the neutral state at this time, the units other than the output side shaft 5o in the stepped automatic transmission 5 are not involved in torque transmission to the drive wheels 9a, 9b and are each in the idle state.

After the engine start illustrated in FIG. 2B, the vehicle 1 travels in the electric CVT mode as illustrated in FIG. 2C. In the electric CVT mode, the carrier 3C of the planetary gear mechanism 3 receives the torque from the started engine 2 via the power input shaft Ax, and the torque is transmitted to the first MG 4 via the pinion gears 3p and the sun gear 3s and is further transmitted to the drive wheels 9a, 9b via the pinion gears 3p, the ring gear 3r, and the output side shaft 5o of the stepped automatic transmission 5.

In the electric CVT mode, the hybrid control unit 10 makes the first MG 4 establish the reactive force against the engine torque through the regenerative rotation of the first MG 4. At this time, the hybrid control unit 10 executes seamless shift change control of the engine rotational speed by adjusting electric power generation torque of the first MG 4.

In addition, in the electric CVT mode, the hybrid control unit 10 causes the power rotation of the second MG 6 to compensate for deficiency of the engine torque when necessary. That is, the drive wheels 9a, 9b are driven by both of the power of the engine 2 and the power of the second MG 6.

After transition to the electric CVT mode, the travel mode is shifted to the direct coupling mode using the stepped automatic transmission 5 on the basis of a vehicle speed condition and a fuel consumption (fuel consumption rate) condition.

First, under such a condition that the vehicle speed V becomes a specified threshold value V1 or higher, a first speed direct coupling travel illustrated in FIG. 3A is performed. At this time, the hybrid control unit 10 first controls the engine rotational speed in the electric CVT mode such that a value (reduction ratio) expressed by "the rotational speed of the engine 2/the number of rotations of the output side shaft 5o" matches a value of a reduction ratio at the first speed in the stepped automatic transmission 5 by adjusting the electric power generation torque of the first MG 4. After the above control, the hybrid control unit 10 instructs the shift change control unit 14 to drive the coupling mechanism 51s in the stepped automatic transmission 5, so as to bring the components constituting the first speed into the coupled states. In this way, the torque of the engine 2 is transmitted to the drive wheels 9a, 9b via the power input shaft Ax, the input side shaft 5i, first speed gears (the drive gear 51i and the driven gear 51o), and the output side shaft 5o.

During such a first speed direct coupling travel, the hybrid control unit 10 brings the first MG 4 and the second MG 6 into the non-driven states. In this way, a temperature increase of each of the first MG 4 and the second MG 6 can be prevented. At this time, the first MG 4 is in the non-driven state, does not establish the reactive force against the engine torque, and is brought into the idle state. Furthermore, because the first MG 4 does not establish the reactive force against the engine torque, the carrier 3c, the pinion gears 3p, the sun gear 3s, the ring gear 3r, and second speed gears (the drive gear 52i and the driven gear 52o) in non-coupled states in the stepped automatic transmission 5 are also brought into the idle states.

In FIGS. 3A, 3B, 3C, number of rotations of the input side shaft 5i in the stepped automatic transmission 5 is represented by an "I" shaft in the collinear diagrams. In each of these collinear diagrams, a slope of a straight line that represents the mechanical relationship among the rotating elements corresponds to the reduction ratio (the engine rotational speed/the number of rotations of the output side shaft 5o). The slope of the straight line in the collinear diagram illustrated in FIG. 3A represents the reduction ratio at the first speed in the stepped automatic transmission 5.

Under such a condition that the vehicle speed obtains a threshold value V2 that is higher than the above-described threshold value V1 after a start of the first speed direct coupling travel, the hybrid control unit 10 controls the shift change (an upshift) from the first speed to the second speed. During such a shift change as the upshift, in order to cancel the coupled states of the components constituting the original shift stage and bring the components constituting the target shift stage into the coupled states, the engine rotational speed has to be reduced in accordance with the reduction ratio at the target shift stage. In the example, the engine rotational speed is adjusted during such a shift change by using the regenerative rotation of the first MG 4. More specifically, the hybrid control unit 10 first instructs the shift change control unit 14 to cancel the coupled states of the components constituting the first speed (that is, bring the components constituting the first speed into the neutral states), and then instructs the first MG control unit 12 to start the regenerative rotation of the first MG 4 and to adjust the electric power generation torque thereof. In this way, the hybrid control unit 10 controls the engine rotational speed such that the value expressed by "the rotational speed of the engine 2/the number of rotations of the output side shaft 5o" matches a value of the reduction ratio at the second speed (see FIG. 3B).

Just as described, a state where the stepped automatic transmission 5 is in the neutral state and the engine rotational speed is controlled by adjusting the electric power generation torque of the first MG 4 (regenerative braking) is similar to the state in the electric CVT mode, which has been described by using FIG. 2C, and the torque of the engine 2 is transmitted to the drive wheels 9a, 9b via the ring gear 3r. In other words, a torque flow of the engine torque is switched from a flow via shift stage gears of the stepped automatic transmission 5 to a flow via the ring gear 3r.

In the power transmission apparatus of the example, the engine power is transmitted to the drive wheels 9a, 9b via the planetary gear mechanism 3 during the shift change as described above, and thus torque loss is eliminated. Note that, in order to further prevent the torque loss, the power rotation of the second MG 6 may be executed to compensate for the deficiency of the torque when necessary (see "X" in FIG. 3B).

Note that a broken straight line in the collinear diagram in FIG. 3B is a linear line at a time when the vehicle speed V is increased to the threshold value V2 or higher in the coupled states of the components constituting the first speed. A solid straight line in the same collinear diagram is a linear line at a time when the reduction ratio at the second speed is achieved by adjusting the electric power generation torque of the first MG 4 as described above.

After executing the control that corresponds to the time of the shift change as described above, the hybrid control unit 10 instructs the shift change control unit 14 to drive the coupling mechanism 52s, so as to bring the components constituting the second speed in the stepped automatic transmission 5 into the coupled states (see FIG. 3C). In this way, the torque of the engine 2 is transmitted to the drive wheels 9a, 9b via the power input shaft Ax, the input side shaft 5i, the second speed gears (the drive gear 52i and the driven gear 52o), and the output side shaft 5o.

Also during such a second speed direct coupling travel, the hybrid control unit 10 brings the first MG 4 and the second MG 6 into the non-driven state so as to prevent the temperature increase of the first MG 4 and the second MG 6. During the second speed direct coupling travel, the first MG 4, the carrier 3c, the pinion gears 3p, the sun gear 3s, the ring gear 3r, and the first speed gears (the drive gear 51i and the driven gear 51o) in uncoupled states in the stepped automatic transmission 5 are brought into the idle states.

In the example, an accelerator ON state continues from the start. After the transition to the second speed direct coupling travel as described above, the accelerator ON state further continues. Then, when the vehicle speed V falls below the threshold value V1 (for instance, when the engine load is increased such as in an uphill travel), the travel is switched to the electric CVT travel.

In addition, even when the vehicle speed V does not fall below the threshold value V1 in the above case, the second speed direct coupling travel is maintained, the gear is changed (downshifted) from the second speed to the first speed, or the second speed direct coupling travel is switched to the electric CVT travel on the basis of a fuel consumption condition. More specifically, a magnitude relationship of the fuel consumption among cases of the second speed direct coupling travel, the first speed direct coupling travel, and the electric CVT travel is identified. Then, the selected travel is performed on the basis of this result.

When the driver makes a deceleration request through accelerator OFF or brake ON during the direct coupling travel, the second MG 6 performs the regenerative rotation, that is, the regenerative braking is achieved, the fuel to the engine 2 is cut, and the components constituting the current shift stage are uncoupled. Then, the engine 2 is brought into the stopped state by rotation control of the first MG 4.

At this time, in the case where the accelerator is turned ON again (a re-acceleration request is made) before the vehicle 1 is brought into the stopped state, the travel mode is shifted to the EV mode. In the case where the requested torque T exceeds upper limit torque of the second MG 6 after the transition to the EV mode, the engine 2 is started, and the travel mode is shifted to the electric CVT mode. After the transition to the electric CVT mode, the travel is switched to the first speed direct coupling travel or the second speed direct coupling travel on the basis of the vehicle speed condition.

Meanwhile, when the requested torque T does not exceed the upper limit torque of the second MG 6, the travel in the EV mode continues until the SOC of the travel battery becomes zero.

3. Processing Procedure

Figure 4:
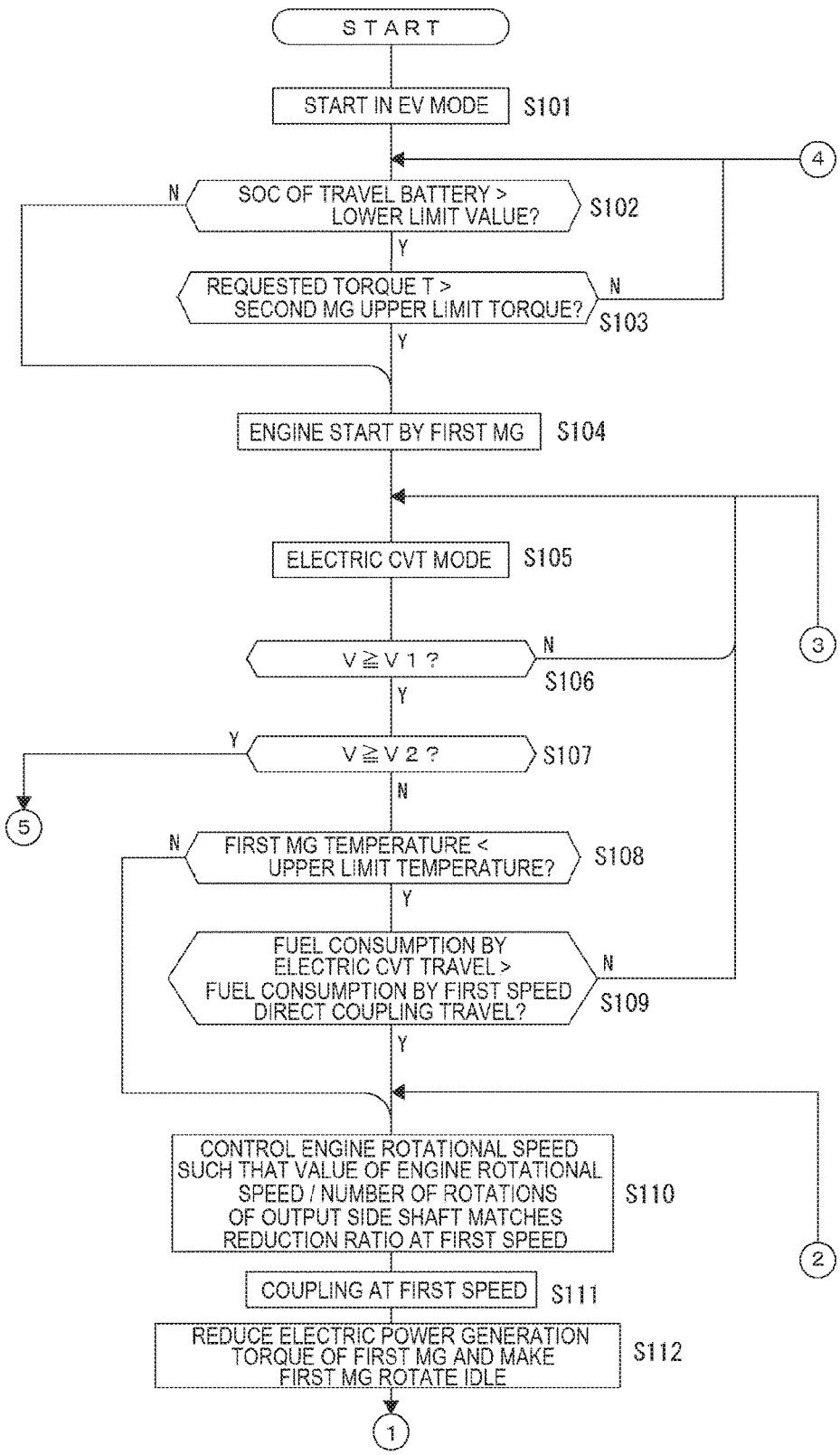
FIG. 4 is a flowchart that illustrates a procedure of specific processing (processing that should be executed in a manner to correspond to accelerator ON) to achieve the travel control as the example.
Figure 5:
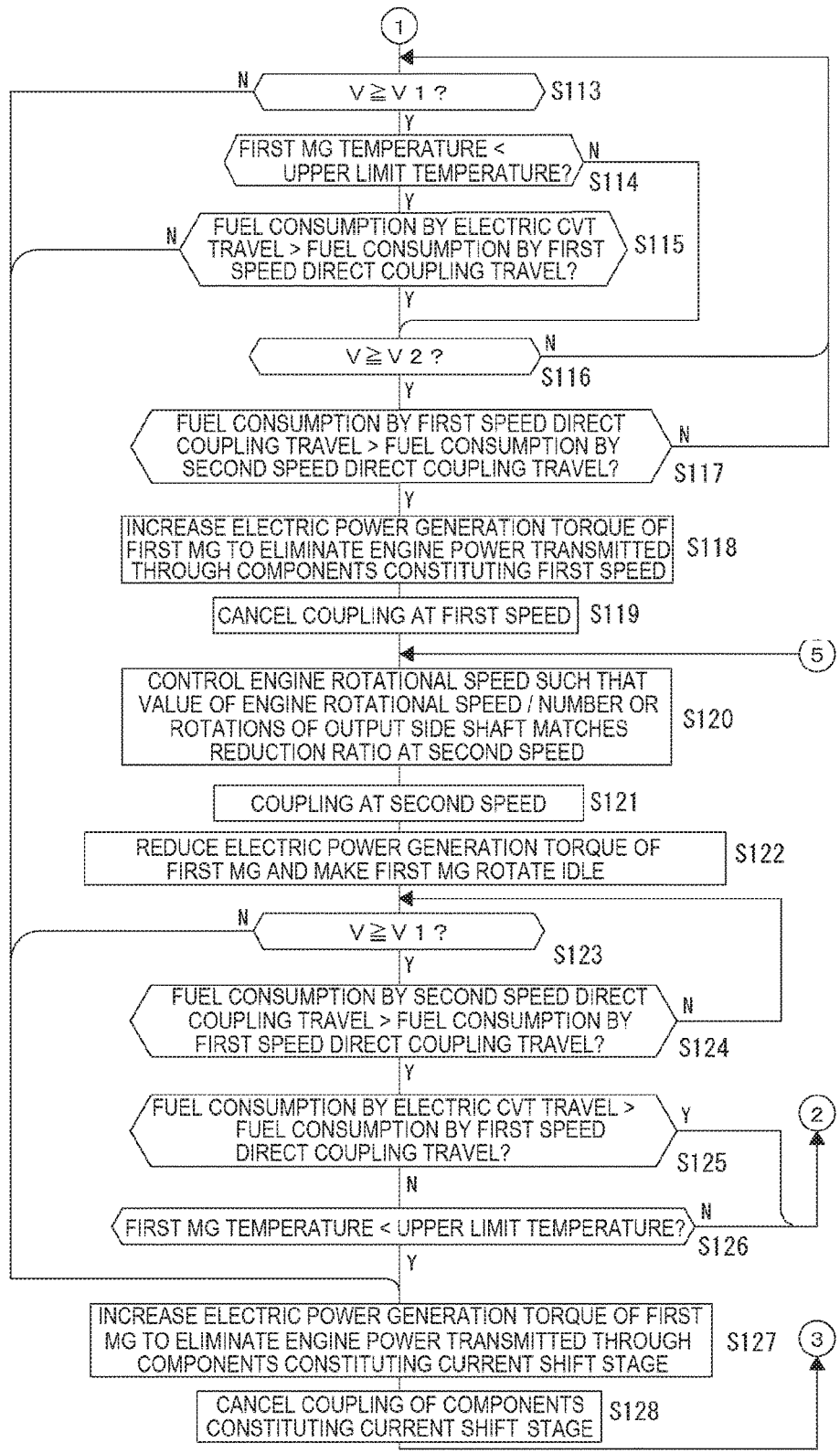
FIG. 5 is a flowchart that illustrates a procedure of the specific processing (the processing that should be executed in the manner to correspond to the accelerator ON) to achieve the travel control as the example.

Next, a description will be made on a specific procedure of processing to achieve the travel control as the example, the overview of which has been described above, with reference to flowcharts in FIG. 4 to FIG. 6. FIG. 4 and FIG. 5 illustrate a specific procedure of processing that should be executed in a manner to correspond to the accelerator ON, and FIG. 6 illustrates a specific procedure of processing that should be executed in a manner to correspond to the deceleration request that is made during the travel in the direct coupling mode.

Figure 6:
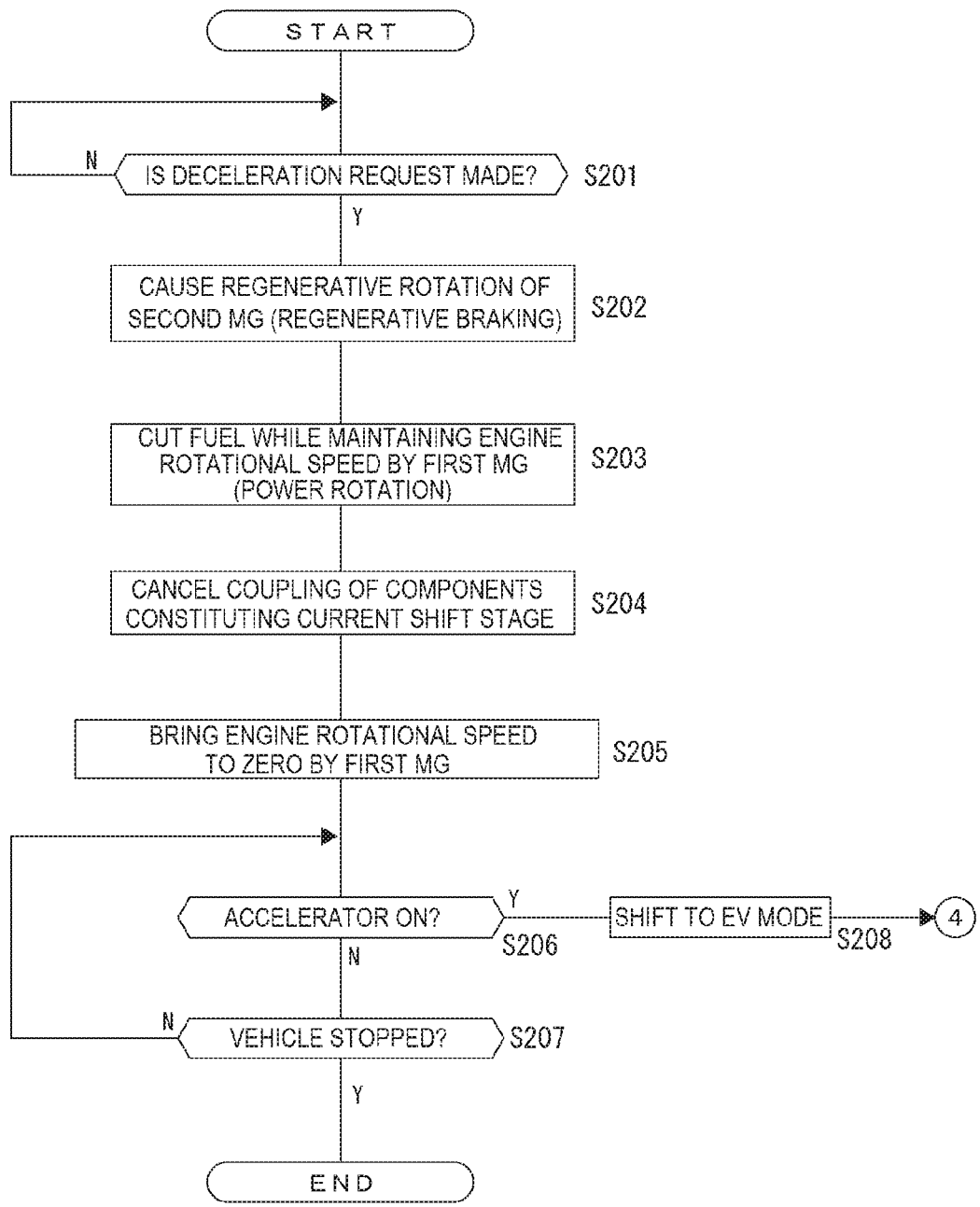
FIG. 6 is a flowchart that illustrates a procedure of specific processing (processing that should be executed in a manner to correspond to a deceleration request during a travel in a direct coupling mode) to achieve the travel control as the example.

Note that, in this example, the CPU in the hybrid control unit 10 executes the processing illustrated in each of FIG. 4 to FIG. 6 in accordance with a software program that is stored in a specified storage device such as the ROM provided in the hybrid control unit 10.

First, in step S101 of FIG. 4, the hybrid control unit 10 executes start processing in the EV mode. In other words, the hybrid control unit 10 causes the power rotation of the second MG 6 in accordance with the accelerator operation to start the vehicle 1.

Next, in step S102, the hybrid control unit 10 determines whether the SOC of the travel battery exceeds a specified lower limit value. If the SOC exceeds the lower limit value, in step S103, the hybrid control unit 10 determines whether the requested torque T exceeds the upper limit torque of the second MG 6. If the requested torque T does not exceed the upper limit torque, the hybrid control unit 10 returns the processing to step S102. In other words, when the second MG 6 can transmit the drive power that corresponds to the requested torque T to the drive wheels 9a, 9b, the travel in the EV mode is continued.

On the other hand, if the SOC of the travel battery does not exceed the lower limit value in step S102, or if the requested torque T exceeds the upper limit torque of the second MG 6 in step S103, the processing proceeds to step S104, and the hybrid control unit 10 executes processing for the engine start by the first MG 4. More specifically, the hybrid control unit 10 instructs the first MG control unit 12 to cause the power rotation of the first MG 4 and also instructs the engine control unit 11 to execute the start control, such as the ignition control, to start the engine 2.

In following step S105, the hybrid control unit 10 shifts the travel mode to the electric CVT mode. As described above, in the electric CVT mode, the hybrid control unit 10 causes the regenerative rotation of the first MG 4 to make the first MG 4 establish the reactive force against the engine torque and executes the seamless shift change control of the engine rotational speed by adjusting the electric power generation torque of the first MG 4. In addition, in the electric CVT mode, the hybrid control unit 10 causes the power rotation of the second MG 6 to compensate for deficiency of the engine torque when necessary.

After the transition to the electric CVT mode in step S105, in step S106, the hybrid control unit 10 determines whether the vehicle speed V is equal to or higher than the threshold value V1. If the vehicle speed V is not equal to or higher than the threshold value V1, the processing returns to step S105, and the electric CVT mode is continued. In other words, when the vehicle 1 travels in the electric CVT mode after the start in the EV mode, the travel in the electric CVT mode is continued until the vehicle speed V is increased to the threshold value V1.

On the other hand, if the vehicle speed V is equal to or higher than the threshold value V1, in step S107, the hybrid control unit 10 determines whether the vehicle speed V is equal to or higher than the threshold value V2. If the vehicle speed V is equal to or higher than the threshold value V2, the hybrid control unit 10 executes processing to shift the travel to the second speed direct coupling travel, which will be described below (see step S120 onward in FIG. 5).

If the vehicle speed V is not equal to or higher than the threshold value V2, in step S108, the hybrid control unit 10 determines whether the temperature of the first MG 4 falls below a specified upper limit temperature. If the temperature falls below the specified upper limit value, in step S109, the hybrid control unit 10 determines whether the fuel consumption (fuel consumption rate) by the electric CVT travel is larger than the fuel consumption by the first speed direct coupling travel (that is, the fuel consumption by the first speed direct coupling travel is favorable). Note that the fuel consumption as a comparison target here is estimated fuel consumption, and the fuel consumption rate that is estimated at a time when a target travel is performed is calculated. The same applies to steps S115, S117, S124, and S125, which will be described below.

If the fuel consumption by the electric CVT travel is not larger than the fuel consumption by the first speed direct coupling travel, the hybrid control unit 10 returns the processing to step S105. More specifically, in the case where it is estimated that the fuel consumption by the first speed direct coupling travel does not become favorable even when the vehicle speed V is increased to the threshold value V1 or higher during the travel the electric CVT mode, in other words, even when the transition to the first speed direct coupling travel is permitted in terms of the vehicle speed condition, a travel state in the electric CVT mode is maintained.

If the fuel consumption by the electric CVT travel is larger than the fuel consumption by the first speed direct coupling travel in step S109, the hybrid control unit 10 executes the processing in step S110 onward, that is, the processing to shift the travel to the first speed direct coupling travel.

If it is determined in step S108 that the temperature of the first MG 4 does not fall below the upper limit temperature, the hybrid control unit 10 skips the determination processing in step S109, and the processing proceeds to step S110. In other words, in the case where the temperature of the first MG 4 reaches the upper limit temperature when the vehicle speed V is increased to the threshold value V1 or higher during the travel in the electric CVT mode, the processing to shift the travel to the first speed direct coupling travel is executed regardless of the fuel consumption by the electric CVT travel and the fuel consumption by the first speed direct coupling travel. In this way, the output is less likely to be restricted by the high temperature of the first MG 4.

In step S110, the hybrid control unit 10 controls the engine rotational speed such that the value of the engine rotational speed/the number of rotations of the output side shaft (the rotational speed of the output side shaft 5o) matches the reduction ratio at the first speed. More specifically, the hybrid control unit 10 instructs the first MG control unit 12 to adjust the load of the engine 2 by adjusting the electric power generation torque of the first MG 4, so as to control the engine rotational speed to a target rotational speed.

In following step S111, the hybrid control unit 10 executes coupling processing at the first speed, that is instructs the shift change control unit 14 to make the shift change actuator 5a perform an operation to bring the components constituting the first speed in the stepped automatic transmission 5 into the coupled states.

Furthermore, in next step S112, the hybrid control unit 10 executes processing to reduce the electric power generation torque of the first MG 4 and make the first MG 4 rotate idle.

Note that, as described above, the hybrid control unit 10 brings the second MG 6 into the non-driven state during the first speed direct coupling travel. That is, when the first MG 4 is shifted to the idle state in step S112, both of the first MG 4 and the second MG 6 are brought into the idle states during the first speed direct coupling travel.

After the hybrid control unit 10 executes the processing in step S112, the processing proceeds to step S113 illustrated in FIG. 5.

In step S113 illustrated in FIG. 5, the hybrid control unit 10 determines whether the vehicle speed V is equal to or higher than the threshold value V1. This corresponds to confirmation of whether a situation where the vehicle speed V falls below the threshold value V1 does not occur during the first speed direct coupling travel. If the vehicle speed V is not equal to or higher than the threshold value V1, that is, if the vehicle speed V falls below the threshold value V1, the hybrid control unit 10 proceeds the processing to step S127.

The processing in step S127 onward is processing to switch from the travel in the direct coupling mode to the travel in the electric CVT mode. More specifically, in step S127, the hybrid control unit 10 first executes processing to increase the electric power generation torque of the first MG 4 so as to cancel the engine power that is transmitted through the components constituting the current shift stage (the first speed during the transition from step S113). In this example, the electric power generation torque is increased such that the engine power that is transmitted through the components constituting the current shift stage becomes zero.

In following step S128, the hybrid control unit 10 executes processing to cancel coupling of the components constituting the current shift stage, that is, processing to instruct the shift change control unit 14 to make the shift change actuator 5a perform an operation to cancel the coupled states of the components constituting the current shift stage. Then, the processing proceeds to step S105 illustrated in FIG. 4.

Due to provision of the processing in step S113 described above, when the vehicle speed V falls below the threshold value V1 (for instance, when the vehicle speed V is decreased due to an uphill or the like while the accelerator ON state continues) during the first speed direct coupling travel, coupling of the components constituting the first speed is canceled, and the first speed direct coupling travel is shifted to the travel in the electric CVT mode.

In step S113, if the vehicle speed V is equal to or higher than the threshold value V1, the processing proceeds to step S114, and the hybrid control unit 10 determines whether the temperature of the first MG 4 falls below the upper limit temperature. If the temperature falls below the upper limit temperature, the processing proceeds to step S115, and the hybrid control unit 10 determines whether the fuel consumption by the electric CVT travel is larger than the fuel consumption by the first speed direct coupling travel.

If the fuel consumption by the electric CVT travel is not larger than the fuel consumption by the first speed direct coupling travel, the hybrid control unit 10 proceeds the processing to step S127 described above. That is, the coupled states of the components constituting the first speed are canceled, and the travel state is shifted to that in the electric CVT mode.

On the other hand, if the fuel consumption by the electric CVT travel is larger than the fuel consumption by the first speed direct coupling travel, the processing proceeds to step S116, and the hybrid control unit 10 determines whether the vehicle speed V is equal to or higher than the threshold value V2. If the vehicle speed V is not equal to or higher than the threshold value V2, the hybrid control unit 10 returns the processing to step S113.

Due to provision of the processing in steps S113 to S116 described above, while the vehicle speed V is maintained to be equal to or higher than the threshold value V1 and lower than the threshold value V2 during the first speed direct coupling travel, a magnitude relationship between the fuel consumption by the first speed direct coupling travel and the fuel consumption by the electric CVT travel is appropriately identified. If the fuel consumption by the first speed direct coupling travel is more favorable, the first speed direct coupling travel is maintained. If not, the first speed direct coupling travel is switched to the electric CVT travel. In this way, the fuel consumption is improved.

If the temperature of the first MG 4 does not fall below the upper limit temperature in step S114, step S115 is skipped, and the processing proceeds to step S116.

In this way, when the temperature of the first MG 4 reaches the upper limit temperature in a state where the vehicle speed V is equal to or higher than the threshold value V1 during the first speed direct coupling travel, the travel mode is not shifted to the electric CVT mode. Thus, the output can be less likely to be restricted by the high temperature of the first MG 4.

If the vehicle speed V is equal to or higher than the threshold value V2 in step S116, the processing proceeds to step S117, and the hybrid control unit 10 determines whether the fuel consumption by the first speed direct coupling travel is larger than the fuel consumption by the second speed direct coupling travel. If the fuel consumption by the first speed direct coupling travel is not larger than the fuel consumption by the second speed direct coupling travel, the processing returns to step S113. More specifically, in the case where it is estimated that the fuel consumption by the second speed direct coupling travel does not become favorable in comparison with the fuel consumption by the first speed direct coupling travel even when the vehicle speed V reaches the threshold value V2 during the first speed direct coupling travel, in other words, even in a state where the transition to the second speed direct coupling travel is permitted in terms of the vehicle speed condition, the first speed direct coupling travel is maintained.

If the fuel consumption by the first speed direct coupling travel is larger than the fuel consumption by the second speed direct coupling travel, the processing proceeds to step S118, and the hybrid control unit 10 executes processing to increase the electric power generation torque of the first MG 4 and eliminate the engine power that is transmitted through the components constituting the first speed. In this example, similar to above step S127, the engine power that is transmitted through the components constituting the first speed is reduced to zero. Furthermore, in following step S119, the hybrid control unit 10 executes processing to cancel coupling of the components constituting the first speed.

After the coupled states of the components constituting the first speed are canceled in step S119, in step S120, the hybrid control unit 10 controls the engine rotational speed such that the value of the engine rotational speed/the number of rotations of the output side shaft matches the reduction ratio at the second speed, and executes processing to couple the components constituting the second speed in following step S121. Furthermore, in next step S122, the hybrid control unit 10 executes the processing to lower the electric power generation torque of the first MG 4 and make the first MG 4 rotate idle.

Note that, as described above, the hybrid control unit 10 also brings the second MG 6 into the non-driven state during the second speed direct coupling travel. That is, when the first MG 4 is shifted to the idle state in step S122, both of the first MG 4 and the second MG 6 are also brought into the idle states during the second speed direct coupling travel.

In step S123 after step S122, the hybrid control unit 10 determines whether the vehicle speed V is equal to or higher than the threshold value V1. This corresponds to confirmation of whether the situation where the vehicle speed V falls below the threshold value V1 does not occur during the second speed direct coupling travel. If the vehicle speed V is not equal to or higher than the threshold value V1, the hybrid control unit 10 proceeds the processing to step S127, which has been described above. In this way, if the vehicle speed V falls below the threshold value V1 during the second speed direct coupling travel, the coupled states of the components constituting the current shift stage are canceled, and the second speed direct coupling travel is shifted to the electric CVT travel.

On the other hand, if the vehicle speed V is equal to or higher than the threshold value V1 in step S123, in step S124, the hybrid control unit 10 determines whether the fuel consumption by the second speed direct coupling travel is larger than the fuel consumption by the first speed direct coupling travel. If the fuel consumption by the second speed direct coupling travel is not larger than the fuel consumption by the first speed direct coupling travel, the processing returns to step S123. More specifically, in the case where it is estimated that the fuel consumption by the second speed direct coupling travel is the same as or more favorable than the fuel consumption by the first speed direct coupling travel when the vehicle speed V is maintained to be equal to or higher than the threshold value V1 during the second speed direct coupling travel, the second speed direct coupling travel is maintained.

If the fuel consumption by the second speed direct coupling travel is larger than the fuel consumption by the first speed direct coupling travel in step S124, the processing proceeds to step S125, and the hybrid control unit 10 determines whether the fuel consumption by the electric CVT travel is larger than the fuel consumption by the first speed direct coupling travel. If the fuel consumption by the electric CVT travel is larger than the fuel consumption by the first speed direct coupling travel, the processing returns to step S110 illustrated in FIG. 4. More specifically, in this case, it is estimated that the fuel consumption by the first speed direct coupling travel is the most favorable of the fuel consumption by the second speed direct coupling travel, the first speed direct coupling travel, and the travel in the electric CVT mode. Thus, the travel is switched to the first speed direct coupling travel.

If the fuel consumption by the electric CVT travel is not larger than the fuel consumption by the first speed direct coupling travel in step S125, the processing proceeds to step S126, and the hybrid control unit 10 determines whether the temperature of the first MG 1 falls below the upper limit temperature. If the temperature does not fall below the upper limit temperature, the processing returns to step S110 illustrated in FIG. 4. More specifically, in this case, it is estimated that the fuel consumption by the travel in the electric CVT mode is the most favorable of the fuel consumption by the travels in the direct coupling mode at the first speed and the second speed and the fuel consumption by the electric CVT travel. However, in order to prevent the output restriction on the first MG 4 from occurring, the travel is switched not to the electric CVT travel but to the first speed direct coupling travel.

On the other hand, if the temperature of the first MG 4 falls below the upper limit temperature, the hybrid control unit 10 proceeds the processing to step S127. In other words, the travel is switched to the electric CVT travel, the fuel consumption by which is identified to be the most favorable.

Next, processing in FIG. 6 will be described.

The processing illustrated in FIG. 6 is executed during the travel in the direct coupling mode.

First, in step S201, the hybrid control unit 10 stands by for the deceleration request. In other words, the hybrid control unit 10 stands by for the accelerator OFF or the brake ON.

If the deceleration request is made, in step S202, the hybrid control unit 10 causes the regenerative rotation of the second MG 6. Then, in step S203, the hybrid control unit 10 cuts the fuel while keeping the engine rotational speed by using the first MG 4. In other words, the hybrid control unit 10 instructs the first MG control unit 12 to cause the power rotation of the first MG 4 and also instructs the engine control unit 11 to cut the fuel to the engine 2.

In following step S204, the hybrid control unit 10 executes processing to cancel coupling of the components constituting the current shift stage. Then, after executing the processing to cancel coupling, in step S205, the hybrid control unit 10 executes processing to bring the engine rotational speed to zero by the first MG 4. In other words, the load of the engine 2 is adjusted by rotating the first MG 4, so as to bring the engine rotational speed to zero (that is, to stop the engine).

In following step S206, the hybrid control unit 10 determines whether the accelerator is turned ON. If the accelerator is not turned ON, in step S207, the hybrid control unit 10 determines whether the vehicle 1 is in a stopped state, that is, whether the vehicle speed V becomes zero. If the vehicle 1 is not in the stopped state, the processing returns to step S206. In other words, the processing in steps S206 and S207 constitutes loop processing to stand by for either one of the re-acceleration request and the stopped state of the vehicle 1 after the deceleration request.

If the vehicle 1 is in the stopped state in step S207, the hybrid control unit 10 terminates the processing illustrated in FIG. 6.

On the other hand, if the accelerator is turned ON in step S206, in step S208, the hybrid control unit 10 executes processing to shift the travel mode to the EV mode. Then, the processing proceeds to step S102 illustrated in FIG. 4. More specifically, in the case where the re-acceleration request is made after the deceleration request is made and before the vehicle 1 is brought into the stopped state, the travel state is shifted to an EV travel state. Then, based on a relationship between the upper limit torque of the second MG 6 and each of the SOC of the travel battery and the requested torque T, the EV travel state is continued, or the travel state is shifted to an electric CVT travel state (see S102 to S105).

At this time, after the travel state is shifted to the electric CVT travel state, the travel is shifted to the first speed direct coupling travel or the second speed direct coupling travel, or the electric CVT travel is maintained on the basis of the vehicle speed condition, the temperature condition of the first MG 4, and the fuel consumption condition (see the processing in S106 onward). More specifically, the electric CVT travel is maintained in the case where the vehicle speed V falls below the threshold value V1, or in the cases where the vehicle speed V is equal to or higher than the threshold value V1 and lower than the threshold value V2, the temperature of the first MG 4 falls below the upper limit temperature, and the fuel consumption by the electric CVT travel is the same as or more favorable than the fuel consumption by the first speed direct coupling travel. Meanwhile, the travel is shifted to the first speed direct coupling travel in the cases where the vehicle speed V is equal to or higher than the threshold value V1 and lower than the threshold value V2, the temperature of the first MG 4 falls below the upper limit temperature, and the fuel consumption by the first speed direct coupling travel is more favorable than the fuel consumption by the electric CVT travel, or in the cases where the vehicle speed V is equal to or higher than the threshold value V1 and lower than the threshold value V2 and the temperature of the first MG 4 is equal to or higher than the upper limit temperature. Furthermore, the travel is shifted to the second speed direct coupling travel in the case where the vehicle speed V is equal to or higher than the threshold value V2.

Note that the case where the number of the shift stages in the stepped automatic transmission 5 is two has been exemplified above. However, the number of the shift stages may be three or more. By increasing the number of the shift stages in the stepped automatic transmission 5, engine operation efficiency can be improved.

In addition, the example in which the vehicle 1 is started in the EV travel has been raised above. However, the vehicle 1 may be started in the electric CVT mode in consideration of the SOC of the travel battery and the like. As a reference, FIG. 7 illustrates a power transmission relationship among the units in the power transmission apparatus in the state where the vehicle speed V becomes zero in the electric CVT mode in a schematic view and a collinear diagram of the power transmission apparatus.

In this case, the vehicle 1 is started when output of the engine 2 is increased in accordance with the accelerator operation.

Just as described, the power transmission apparatus of the example can start the vehicle 1 in the electric CVT mode. Thus, even when the travel battery is depleted and the second MG 6 is brought into an inoperable state, the vehicle 1 can be started.

In the power transmission apparatus of the example, the electric power is generated through the regenerative rotation of the first MG 4, which is performed during the shift change of the stepped automatic transmission 5 (see S110, S120). The thus-generated electric power can be used for the power rotation of the second MG 6, so as to compensate for the torque loss during the shift change.

4. Summary of the Example

As it has been described above, the power transmission apparatus of the example includes the planetary gear mechanism (3), the first motor generator (4), the second motor generator (6), and the stepped automatic transmission (5) with the parallel gears. The power input shaft (Ax) from the engine (2), which is provided in the vehicle (1), is coupled to the first motor generator (4) and the output side shaft (5*o*) of the stepped automatic transmission (5) via the planetary gear mechanism (3). The input side shaft (5*i*) of the stepped automatic transmission (5) is coupled to the power input shaft (Ax). The second motor generator (6) is coupled to the output side shaft (5*o*) of the stepped automatic transmission (5).

In the power transmission apparatus as the above example, the power input shaft from the engine is coupled to the input side shaft of the stepped automatic transmission. Thus, when the components constituting the required shift stage in the stepped automatic transmission are brought into the coupled states, the power from the engine can efficiently be transmitted to the drive wheels in a similar manner to a manual transmission vehicle.

In addition, in the power transmission apparatus, a coupling mode between the engine and each of the first and second motor generators via the planetary gear mechanism is the same as that in a split hybrid system. Thus, the vehicle can be started by using the power of the second motor generator, and a clutch can be eliminated.

Furthermore, in the power transmission apparatus, the output side shaft of the stepped automatic transmission is coupled to the power input shaft from the engine via the planetary gear mechanism. Thus, when the stepped automatic transmission is temporarily brought into the neutral state during the shift change, the engine power can be transmitted to the output side shaft of the stepped automatic transmission, that is, the drive wheel side via the planetary gear mechanism. In this way, use of a component as the second motor generator that can generate an equivalent magnitude of the torque to the engine torque is no longer needed to prevent the torque loss during the shift change. Thus, enlargement of the second motor generator can be prevented.

Accordingly, in order to improve start quality by eliminating the clutch and to efficiently transmit the engine power to the drive wheels via the stepped transmission with the parallel gears, the torque loss during the shift change can be prevented, and degradation of the fuel consumption and restriction on vehicle design can be alleviated.

Unlike the split hybrid system, an electric path between the first MG 4 and the second MG 6 is unnecessary in the power transmission apparatus of the example during the travel in the direct coupling mode. Accordingly, power transmission efficiency can be improved, and a chance of the output restriction, which is caused by the high temperature of the first MG 4 or the second MG 6, can be reduced. In other words, because the first MG 4 constantly establishes the reactive force against the engine power in the split hybrid system, the output restriction by heat is more likely to occur, and this particularly leads to a problem of degraded performance during a towing travel and the uphill travel. However, the power transmission apparatus of the example can prevent occurrence of such a problem.

Furthermore, according to the power transmission apparatus of the example, the first MG 4 or the second MG 6 can compensate for the torque loss during the shift change. Thus, an effect of eliminating a torque fluctuation during the travel, which is caused by the torque loss, can be enhanced. As a result, ride quality and drivability can be improved.

The power transmission apparatus of the example includes the control unit (hybrid control unit 10) that synchronizes the rotation of the input side shaft and the rotation of the output side shaft in the stepped automatic transmission by causing the regenerative rotation of the first motor generator to lower the engine rotational speed at a time when the shift stage is changed to the shift stage with the smaller transmission gear ratio in the stepped automatic transmission.

As described above, in the power transmission apparatus of the example, the engine load can be adjusted by the regenerative rotation of (electric power generation by) the first MG. Accordingly, the engine load is adjusted by the regenerative rotation of the first MG so as to synchronize the rotation during the upshift.

In this way, regenerative electric power can be obtained every time the shift stage is changed as the upshift. Thus, energy efficiency can be improved.

In the power transmission apparatus of the example, the control unit makes the first motor generator rotate idle while the components constituting any of the shift stages in the stepped automatic transmission are brought into the coupled states, and the engine power, which is transmitted to the input side shaft, is transmitted to the output side shaft.

In this way, an effect of preventing the output restriction that is associated with the temperature increase of the first MG from occurring can be enhanced. Thus, degradation of the drivability caused by the output restriction can be prevented.

In the power transmission apparatus of the example, the mode in which the stepped automatic transmission is in the neutral state and the first motor generator establishes the reactive force against the engine power by the regenerative rotation via the planetary gear mechanism is set as the electric CVT mode. The mode in which the engine power is transmitted from the input side shaft to the output side shaft via the components constituting the first shift stage with the highest transmission gear ratio in the stepped automatic transmission is set as the first speed direct coupling mode. When the vehicle speed is increased during the travel in the electric CVT mode, the control unit determines whether the first motor generator satisfies the specified upper limit temperature condition. If the temperature condition is satisfied, the control unit executes the control such that the vehicle travels in the mode that is selected from the travel in the electric CVT mode and the travel in the first speed direct coupling mode on the basis of the fuel consumption rate of the engine. If the temperature condition is not satisfied, the control unit executes the control such that the travel is switched to the travel in the first speed direct coupling mode regardless of the fuel consumption rate by the travel in the electric CVT mode and the fuel consumption rate by the travel in the first speed direct coupling mode.

In this way, the effect of preventing the output restriction, which is caused by the high temperature of the first MG, from occurring can be enhanced while the fuel consumption is improved.

That is, both of the improved fuel consumption and the prevention of the degraded drivability can simultaneously be achieved.

In the power transmission apparatus of the example, the mode in which the stepped automatic transmission is in the neutral state and the first motor generator establishes the reactive force against the engine power by the regenerative rotation via the planetary gear mechanism is set as the electric CVT mode. The mode in which the components constituting any of the shift stages in the stepped automatic transmission are brought into the coupled states and the engine power is transmitted from the input side shaft to the output side shaft via the components constituting the current shift stage is set as the direct coupling mode. The control unit identifies the magnitude relationship between the fuel consumption rate of the engine during the travel in which coupling of the components constituting the current shift stage in the stepped automatic transmission is maintained during the travel in the direct coupling mode and the fuel consumption rate of the engine during the travel in the electric CVT mode. When the fuel consumption rate of the engine during the travel in the electric CVT mode is the lowest, the control unit executes the control to switch the travel to the travel in the electric CVT mode.

Accordingly, when the travel in the electric CVT mode is preferred in terms of the fuel consumption rate even during the travel in the direct coupling mode, the travel mode is switched to the electric CVT mode.

Thus, the fuel consumption can be improved.

In the power transmission apparatus of the example, the control unit executes the switching control to the electric CVT mode under such a condition that the first motor generator satisfies the specified upper limit temperature condition.

In this way, the effect of preventing the output restriction, which is caused by the high temperature of the first motor generator, from occurring can be enhanced while the degradation of the fuel consumption is prevented.

That is, both of the improved fuel consumption and the prevention of the degraded drivability can simultaneously be achieved.

In the power transmission apparatus of the example, when the shift stage is changed to the shift stage with the lower transmission gear ratio in the stepped automatic transmission, the control unit increases the electric power generation amount by the first motor generator, eliminates the engine power that is transmitted through the components constituting the original shift stage, and then cancels the coupled states of the components constituting the original shift stage.

In this way, the engine power is transmitted to the output side shaft of the stepped automatic transmission via the planetary gear mechanism in the period in which the stepped automatic transmission is temporarily brought into the neutral state for the upshift.

Accordingly, the torque loss during the shift change can be prevented.

According to the power transmission apparatus of the example, in order to improve the start quality by eliminating the clutch and to efficiently transmit the engine power to the drive wheels via the stepped transmission with the parallel gears, the torque loss during the shift change can be prevented, and the degradation of the fuel consumption and the restriction on the vehicle design can be alleviated.

5. Modified Examples

The example of the present invention has been described so far. However, the present invention is not limited to the specific example that has been described so far, and various modified examples can be considered therefor.

For instance, the example in which the shift stage in the stepped automatic transmission 5 is automatically changed without an operation on the basis of the vehicle speed condition and the like has been raised above. However, it may be configured to change the shift stage in accordance with an operation to instruct the shift change.

The example in which the vehicle speed condition for switching between the travel in the direct coupling mode and the electric CVT travel and the vehicle speed condition for the shift change in the stepped automatic transmission 5 are fixed has been described above. However, the vehicle speed condition can be set to be variable on the basis of a specified condition such as selection of a drive mode (for instance, a normal mode, a sport mode, or the like) in accordance with a gradient change of a travel road or by an operation.

The example in which the coupled states of the components constituting the current shift stage are unconditionally canceled during the deceleration in response to the deceleration request in the direct coupling travel has been described above. However, the coupled states of the components constituting the current shift stage can also be canceled on the basis of a specified condition such as the vehicle speed or the engine rotational speed. In addition, during the deceleration, the shift stage may be changed to the shift stage with the higher transmission gear ratio on the basis of the specified condition such as the vehicle speed or the engine rotational speed. This is effective in such a scene where active use of engine braking is desired during a travel on a relatively steep downhill travel road.

The invention claimed is:

1. A power transmission apparatus configured to be mounted on a vehicle, the apparatus comprising:
   a planetary gear mechanism;
   a first motor generator;
   a second motor generator; and
   a stepped automatic transmission with parallel gears, wherein
   the first motor generator and an output side shaft of the stepped automatic transmission are configured to be coupled to a power input shaft from an engine provided in the vehicle via the planetary gear mechanism,
   an input side shaft of the stepped automatic transmission is configured to be coupled to the power input shaft, and
   the second motor generator is coupled to the output side shaft of the stepped automatic transmission.

2. The power transmission apparatus according to claim 1 further comprising:
   a control unit configured to synchronize rotation of the input side shaft and rotation of the output side shaft in the stepped automatic transmission by causing regenerative rotation of the first motor generator to reduce an engine rotational speed when a shift stage is changed to a shift stage with a lower transmission gear ratio in the stepped automatic transmission.

3. The power transmission apparatus according to claim 2, wherein
   the control unit is configured to make the first motor generator rotate idle while coupling by any one of the shift stages in the stepped automatic transmission is made and engine power that is transmitted to the input side shaft is transmitted to the output side shaft.

4. The power transmission apparatus according to claim 3, wherein the control unit is configured to
   determine whether the first motor generator satisfies a specified upper limit temperature condition in response to an increase in a vehicle speed while a travel mode in which the vehicle travels an electric CVT mode,
   execute control such that that the travel mode is selected from the electric CVT mode and a travel in the first speed direct coupling mode on the basis of a fuel consumption rate of the engine when the temperature condition is satisfied, and
   execute control such that the travel mode is switched to the first speed direct coupling mode regardless of the fuel consumption rate in the electric CVT mode and the fuel consumption rate in the first speed direct coupling mode when the temperature condition is not satisfied, the electric CVT mode being a mode in which the stepped automatic transmission is in a neutral state and the first motor generator establishes a reactive force against the engine power by the regenerative rotation via the planetary gear mechanism, the first speed direct coupling mode being a mode in which the engine power is transmitted from the input side shaft to the output side shaft via a first shift stage with the highest transmission gear ratio in the stepped automatic transmission.

5. The power transmission apparatus according to claim 3, wherein the control unit is configured to
   identify a magnitude relationship between a fuel consumption rate of the engine in a case that coupling by the current shift stage in the stepped automatic transmission is maintained while a travel mode in which the vehicle travels is an direct coupling mode, and the fuel consumption rate of the engine while the travel mode is the electric CVT mode, and
   execute control such that the travel mode is switched to the electric CVT mode when the fuel consumption rate in the electric CVT mode is the lowest,
   the electric CVT mode being a mode in which the stepped automatic transmission is brought into the neutral state and the first motor generator establishes the reactive force against the engine power by the regenerative rotation via the planetary gear mechanism, the direct coupling mode being a mode in which coupling by any one of the shift stages in the stepped automatic transmission is made and the engine power is transmitted from the input side shaft to the output side shaft via the any one of the shift stages.

6. The power transmission apparatus according to claim 5, wherein the control unit is configured to execute control that switches the travel mode to the electric CVT mode under such a condition that the first motor generator satisfies a specified upper limit temperature condition.

7. The power transmission apparatus according to claim 3, wherein the control unit is configured to increase an electric power generation amount by the first motor generator, eliminate the engine power that is transmitted through coupling by an original shift stage, and then cancel the coupling by the original shift stage when the shift stage is changed to the shift stage with the lower transmission gear ratio in the stepped automatic transmission.

8. The power transmission apparatus according to claim 2, wherein the control unit is configured to
   determine whether the first motor generator satisfies a specified upper limit temperature condition in response to an increase in a vehicle speed while a travel mode in which the vehicle travels an electric CVT mode, execute control such that that the travel mode is selected from the electric CVT mode and a travel in the first speed direct coupling mode on the basis of a fuel consumption rate of the engine when the temperature condition is satisfied, and execute control such that the travel mode is switched to the first speed direct coupling mode regardless of the fuel consumption rate in the electric CVT mode and the fuel consumption rate in the first speed direct coupling mode when the temperature condition is not satisfied, the electric CVT mode being a mode in which the stepped automatic transmission is in a neutral state and the first motor generator establishes a reactive force against the engine power by the regenerative rotation via the planetary gear mechanism, the first speed direct coupling mode being a mode in which the engine power is transmitted from the input side shaft to the output side shaft via a first shift stage with the highest transmission gear ratio in the stepped automatic transmission.

9. The power transmission apparatus according to claim 2, wherein the control unit is configured to identify a magnitude relationship between a fuel consumption rate of the engine in a case that coupling by the current shift stage in the stepped automatic transmission is maintained while a travel mode in which the vehicle travels is an direct coupling mode, and the fuel consumption rate of the engine while the travel mode is the electric CVT mode, and execute control such that the travel mode is switched to the electric CVT mode when the fuel consumption rate in the electric CVT mode is the lowest, the electric CVT mode being a mode in which the stepped automatic transmission is brought into the neutral state and the first motor generator establishes the reactive force against the engine power by the regenerative rotation via the planetary gear mechanism, the direct coupling mode being a mode in which coupling by any one of the shift stages in the stepped automatic transmission is made and the engine power is transmitted from the input side shaft to the output side shaft via the any one of the shift stages.

10. The power transmission apparatus according to claim 9, wherein the control unit is configured to execute control that switches the travel mode to the electric CVT mode under such a condition that the first motor generator satisfies a specified upper limit temperature condition.

11. The power transmission apparatus according to claim 2, wherein the control unit is configured to increase an electric power generation amount by the first motor generator, eliminate the engine power that is transmitted through coupling by an original shift stage, and then cancel the coupling by the original shift stage when the shift stage is changed to the shift stage with the lower transmission gear ratio in the stepped automatic transmission.

\* \* \* \* \*